United States Patent [19]
Yepez

[11] Patent Number: 5,804,325
[45] Date of Patent: Sep. 8, 1998

[54] NON POISONING FUEL CELL AND METHOD

[75] Inventor: Omar Yepez, Short Hills, N.J.

[73] Assignee: Westfield Trading Corporation, New York, N.Y.

[21] Appl. No.: 371,984

[22] Filed: Jan. 13, 1995

[51] Int. Cl.⁶ .................................................. H01M 13/00
[52] U.S. Cl. .................................................................. 429/13
[58] Field of Search ..................................................... 429/13

[56] References Cited

U.S. PATENT DOCUMENTS

| | | | |
|---|---|---|---|
| 3,180,762 | 4/1965 | Oswin | 429/13 |
| 3,393,098 | 7/1968 | Hartner et al. | 429/13 |
| 4,547,273 | 10/1985 | Ayers | 204/73 R |

Primary Examiner—Kathryn L. Gorgos
Attorney, Agent, or Firm—Omri M. Behr, Esq.

[57] ABSTRACT

This invention relates to an apparatus configuration and a method of operation for fuel cells that use as fuel any carbon compound. These cells are built with anodes capable of storing and diffusing hydrogen, where the complete oxidation of the carbon fuel to carbon dioxide occurs, and cathodes that use atmospheric oxygen as an oxidant. An aspect of the invention is the deliberate occlusion of hydrogen in the anode during the operation of the fuel cells, in order to eliminate or greatly reduce the poisoning of the electrocatalyst. Fuel cells according to the invention will be more competitive with existing power sources in price, operational costs, power output, lifetime, volume and pollution emission. Implementation of the invention can also be used to upgrade old fuel cells and to detect and destroy carbon compounds in medical or pollution control applications.

9 Claims, 10 Drawing Sheets

METHANOL 0.2 M + HCO₃⁻ (sat) ON Pd
LOADED WITH HYDROGEN.

ETHANOL 0.2 M + HCO$_3^-$ (sat) ON Pd
LOADED WITH HYDROGEN.

BUTHANOL 0.2 M + $HCO_3^-$ (sat) ON Pd LOADED WITH HYDROGEN.

SUCROSE 0.2 M + HCO$_3^-$ (sat) ON Pd
LOADED WITH HYDROGEN.

SCN⁻ (THIOCYANATE) 0.2 M + $HCO_3^-$ (sat) ON Pd LOADED WITH HYDROGEN.

METHANOL 0.2 M + HCQ — (sat) ON Ni
LOADED WITH HYDROGEN.

NON POISONING FUEL CELL AND METHOD

TECHNICAL FIELD

This invention relates to fuel cells and more specifically to a new configuration of fuel cells and new methods of generating electricity with the use of fuel cells. The new configuration and new method of operation makes possible commercially viable fuel cells that use as fuel any carbon compound, eliminating or greatly reducing the undesirable poisoning of the electrocatalyst.

BACKGROUND

In recent years, the manufacturers of fuel cells have been able to cut the prices of the fuel cells, but still the costs are too high. With the existing technology, the cost of installed capacity for a fuel cell is about $ 3,000 per kilowatt, a big drop from the $ 5,000 or more that such capacity once cost; but still more than double the cost of a small conventional power plant with the same output. Many of the problems that make fuel cells a very expensive and not competitive alternative to conventional power sources can be traced to the poisoning of the electrocatalyst. It is well known that fuel cells using carbon compounds as fuels and air as oxidant experience electrocatalyst poisoning. This poisoning causes an extremely steep decline of the fuel cell current density, after a short period of operation. This drawback has slowed the commercial introduction of fuel cells.

The poisoning problem was stated by R. Parsons and T. Vandernoot in an article in the Journal of Electroanalytical Chemistry (Vol 257, Pag, 9, 1988), as follows: "The principal limitation to viable organic fuel cells at this time is the poisoning of the electrode". Furthermore, they point out that the poisoning agent common in the electro oxidation of small organic molecules is carbon monoxide (CO), an intermediate in the oxidation to carbon dioxide ($CO_2$). The clear identification of the CO as the poison was possible through the conclusive data obtained using in situ spectroscopic techniques. By this means, it was proved that the CO molecule is strongly adsorbed on the electroactive surface obstructing the oxidation of new fuel molecules. In the same review, Parson and Vandernoot mention that a way to avoid the poisoning is using the "third body effect". This is done by adsorbing small amounts of a different metal (adatome) on the electrocatalyst. However, these adatomes or absorbed atoms are not stable and can be oxidized. Also, the layers of adatomes are rearranged and incorporated in the substratum thus canceling their beneficial effects.

Finally, Parson and Vandernoot suggested several areas of research to try to reduce the poisoning of the electrode. The problem with those suggestions is that they did not lead to the development of viable commercial fuel cells. For example, they recommended to go further in the use of non-noble electrodes modified by surface monolayers of platinum adatomes. This approach makes less expensive catalysts without losing catalytic activity, but the rearrangement of surface adatomes continues to be a problem, because as explained above; the adatomes are incorporated in the substratum losing their usefulness. The above mentioned article also suggests the use of gold in alkaline solutions, in spite of the cost and carbonation problems, and recommended the use of costly exotic metals porphirins and platinum clusters.

The quest to reduce or eliminate the poisoning agent generated much of research; however, up to now the results obtained have not been commercially successful. See for example Reddy et al, U.S. Pat No. 5,051,156 that discloses the use of gold single crystals for the oxidation of alcohol, Reddy's patented approach is a very expensive and impractical proposition, because a complex and an expensive process is required to Page 2. obtain single oriented gold crystals. Furthermore, too many of those gold crystals are needed to generate enough current density.

Studying the electro oxidation of methane over palladium, B. Sharifker and 0. Yepez (See U.S. Pat. No. 5,051,156) discovered that methane was transformed into methanol, ethanol, isopropanol and acetone, when an oxidizing potential was applied over a palladium electrode with hydrogen deliberately occluded. From this finding, it was concluded that the methane was oxided to carbon monoxide (CO) due to the potential applied, and that the byproducts obtained were generated by the reduction of aldehydes and ketones previously produced by the interaction of (CO) with the hydrogen deliberately occluded in the metal, as follows:

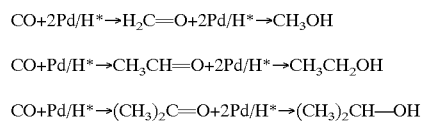

These reactions also show that carbon monoxide is removed from the surface, implying that the poisoning effect is eliminated by the hydrogen deliberately occluded in the palladium. To test this hypothesis, further CO oxidation experiments were conducted, which revealed that it was easier to produce carbon dioxide ($CO_2$) when the amounts of hydrogen occluded in the palladium were increased. These last results confirmed the hypothesis that the occluded hydrogen reacts with the carbon monoxide (CO), and the product is brought to the double layer, where the potential applied causes it to fuirther oxidize to carbon dioxide.

There are several issued patents that disclose materials that store and diffuse hydrogen as electrodes in batteries. See U.S. Pat. Nos.: 5,104,753 (Sakai et al, "Hydrogen storage electrode and process for producing the same"), 5,242,766 (Furukawa et al, "Hydrogen occlusion electrode"), 5,277, 998 (Furukawa et al, "Hydrogen absorbing alloy electrode"), and 5,277,998 (Ovshinsky et al, "Electrochemical hydrogen storage alloys and batteries"). These patents purport to disclose occluded hydrogen oxidized in the anode. However, these patents apply solely to batteries, not to fuel cells, and in those cases, hydrogen was used only as a fuel. In the Sakai et al invention and in the others that use occluded hydrogen as fuel, the only reaction that occurs in the anode surface is the oxidation of the hydrogen as follows:

This leads to the building of, batteries that stop generating electricity when the occluded hydrogen is depleted.

SUMMARY OF EXEMPLARY EMBODIMENTS OF THE INVENTION

A fuel cell according to the principles of the present invention uses the hydrogen deliberately occluded in the anode to eliminate or greatly reduce the poisoning of the electrocatalyst effect in fuel cells that use a carbon compound as fuel. In such nonpoisoning fuel cells, the current generated will not stop so long as the anode is continuosly supplied with hydrogen. The chemical reaction that occurs in the surface of the electrocatalyst is:

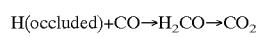

Thus, the occluded hydrogen in the anode is used to chemidesorb the poisons and the resulting products are brought to the double layer, where they undergo further oxidation to $CO_2$ due to the action of the electrical field. From now on, the deliberately hydrogen occluded fuel cell anode according to the present invention will be referred to as "the non poisoning anode (NPA)".

Various advantages and benefits of fuel cells made and operating according to the principles of the present invention will become apparent with the following detailed description of embodiments when taken in view of the appended drawings in which:

DRAWINGS

DESCRIPTION OF EXEMPLARY EMBODIMENTS OF THE INVENTION

Figure 1:
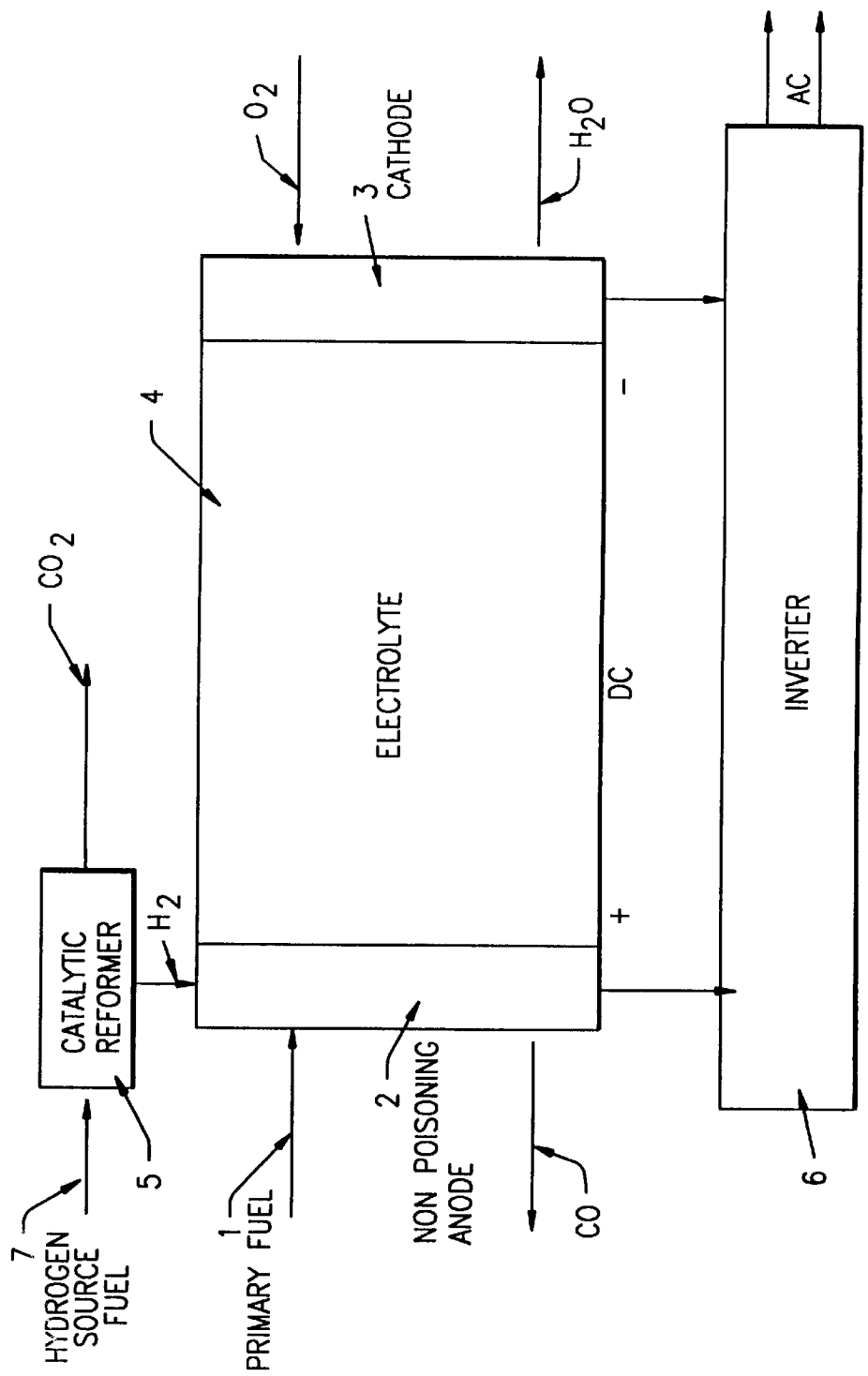
FIG. 1 is a schematic representation of a non poisoning fuel cell apparatus configured and operating according to the principles of the present invention.
Figure 2:
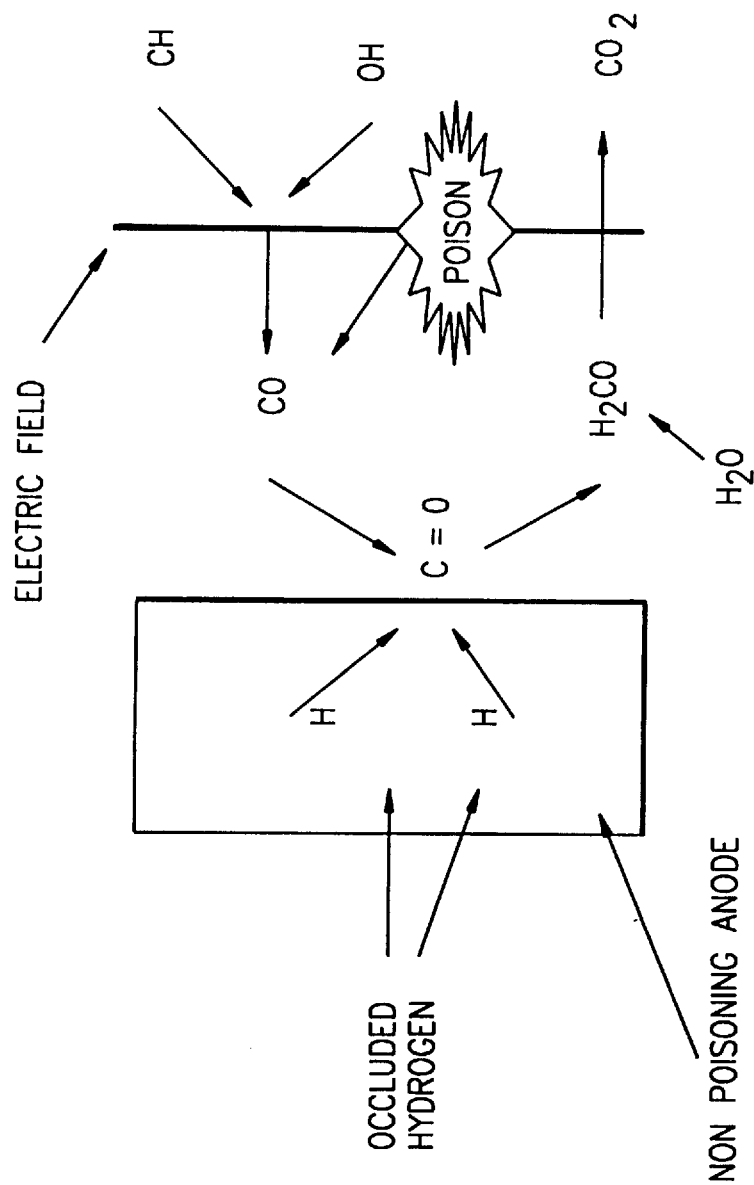
FIG. 2 is a diagramatic representation of the chemidesorption function occurring at the anode of FIG. 1.
Figure 3:
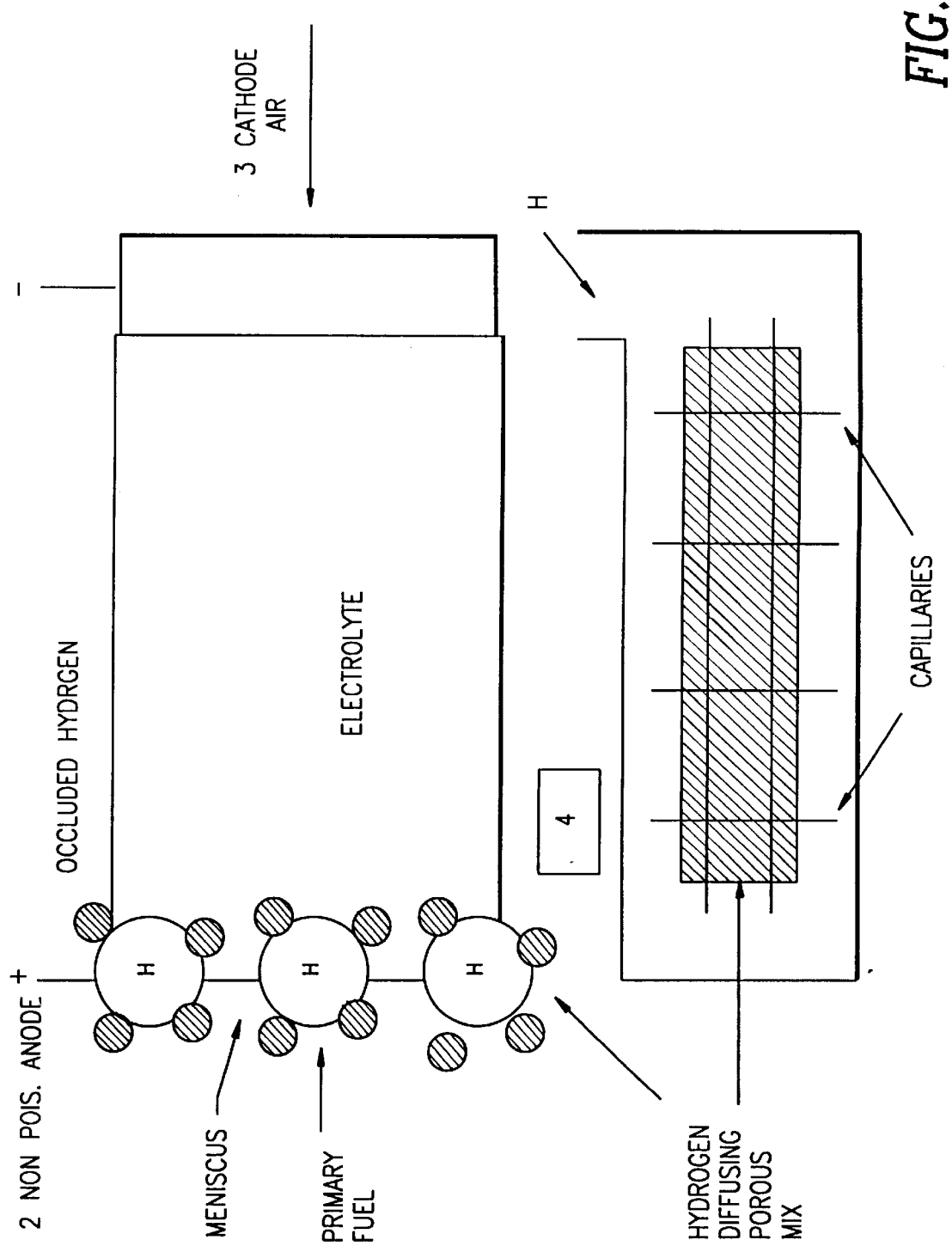
FIG. 3 is a schematic representation of a non poisoning anode made of a porous mix with capillaries.

This invention relates to an apparatus configuration and a method of operation for non poisoning fuel cells assembled as shown in FIGS. 1–3. This fuel cell is designed to oxidize carbon compounds (e.g. fossil fuels, alcohols, sugars, thiocyanates, CO, etc.) to be used as primary fuel 1, to produce electricity. This non poisoning fuel cell comprises:

1) A non poisoning anode (NPA) 2, made of a material belonging to a class of metalic elements and its alloys capable of storing and diffusing hydrogen (e.g. Ni, Pd, Fe, Cu, V, Ta, Ti and their alloys, and mixtures, etc.).
2) A cathode 3 that can be made the same as a conventional gas diffusion electrode for the reduction of oxygen. athmospheric air or any other fluid that can be employed as oxidant.
3) An electrolyte 4 able to tolerate carbonation, such as phosphoric acid or saturated bicarbonate solutions.
4) A hydrogen source 5 (e.g. a catalytic reformer) connected to the anode to deliberately occlude hydrogen on the anode and keep it continuosly hydridized in order to avoid or greatly reduce the poisoning of the electrocatalyst.
5) An inverter 6 to convert the DC output to AC.

FIG. 1 shows two fuel lines. The primary fuel line1 feeds a carbon compound to the fuel cell to generate electricity. Fuel line 7 feeds the hydrogen source (e.g. a catalytic reformer) to produce hydrogen to hydridize the anode during the operation of the fuel cell. The fuels used in the two fuel lines need not necesarily be the same. For example, methanol can be used as the combustible for the fuel cell and methane for the catalytic reformer, or methane can be used in both lines, if desired.

The fuel cell of FIG. 1 generates a constant current, without developing the poisoning of the electrocatalyst, when the anode is kept hydridized. This poisoning phenomenon is brought about in conventional fuel cells because the oxidation of any carbon compound produces undesirable intermediates that interfere and eventually stop the oxidation reaction. Such intermediates can include CO (CO ads) and possibly CHO (CHO ads). In the fuel cell of FIG. 1, hydrogen (H) is deliberately occluded in the anode during the operation as further described below. This hydrogen reacts with the intermediates chemidesorbing them and, effectively cleansing the surface of the electrocatalyst making possible the continuous reaction of this surface with new molecules of the carbon compounds used as fuel, thus eliminating the poisoning. FIG. 2 shows graphically the poison chemidesorption process. The anode poison chemidesorption reaction is as follows:

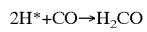

NON POISONING FUEL CELLS

Non poisoning fuel cells (NPFCs) according with this invention are multifuel devices capable to consume as fuel any carbon compound, without the need to use a catalytic reformer to generate pure hydrogen to feed the fuel cell. Said devices can be built using solid electrodes (SEs), conventional porous gas diffusion electrodes (CPGDEs), or new types of unconventional porous gas diffuasion electrodes (UPGDEs). Solid electrodes are not well suited for the manufacturing of commercial NPFCs due to its low current output. Commercial NPFCs can be built using CPGDEs, by means of a switching operation, but this mode of operation is not very efficient. To take full advantage of the method of this invention in the manufacturing of commercial NPFCs, it is preferable to use as anodes new configurations of UPGDEs. Several new configurations of UPGDEs, including porous gas diffusion anodes with capillaries, porous metal anodes and porous screen anodes are proposed as a non poisoning anodes. This list is not exhaustive, there are many other types of nonpoisoning anodes configurations than can be used to built NPFCs in accordance with the method of this invention. In the next paragraphs those new apparatus configurations will be described.

NPFCs BUILT WITH POROUS MIX ANODES AND CAPILLARIES

The non poisoning anode built with a porous mix and capillaries is shown in FIG. 3. The capillaries are made of hollow electrical conducting materials capable of conveying gaseous hydrogen therethrough. The net of capillaries also works as a current collector for the fuel cell. The capillaries net is embedded into a porous mix made of a hydrogen conducting material, small particles of the electrocatalyst and TEFLON, creating a porous structure for the non poisoning anode. The porous structure is made sufficiently wetproof by the use of colloidal polytetrafluorethylene, (sold under the trademark Teflon, by Dupont Corporation). The electrocatalyst particles, are intentionally placed in the meniscus edge zones of the porous anode, because it has been proven that to be effective the catalyst need only be present near a meniscus edge (See Fuel Cell handbook). These are the electrocatalyst particles that are poisoned when they react with the carbon compound fuel in the menisci edges. This fuel cell works as follows: the gaseous hydrogen produced by an external source 5 (e.g. a catalytic reformer) is driven into the body of the porous anode through the net of capillaries 11. The hydrogen deliberately driven inside the anode goes through the Capillaries walls and then through the hydrogen conducting porous mix 12, finally reaching the electrocatalyst particles 13 in the meniscus zone 14, occluding them 15. When the poisoning of the catalyst emerges, the occluded hydrogen reacts with the poison, chemidesorbing the carbon monoxide (CO) that has been produced during the electrocatalytic oxidation of the carbon compound. Finally, the products of this reaction are further oxidized to $CO_2$, effectively removing the poison from the surface. In this way, the fuel cell will keep generating current continuously as long as the electrocatalyst particles of the anode are occluded with hydrogen.

NPFCs BUILT WITH NON CONVENTIONAL POROUS METAL ANODES

Porous metal electrodes were the first type of electrode used to build fuel cells, and many people think that this concept is outdated. However, given its characteristics, an updated version of this electrode can be used as a non poisoning anode. Originally, those electrodes were constructed as metal powder sinters, but in the case of this invention, they are simply a flat screen made out of a inexpensive electroactive porous metal (e.g.: nickel). To optimize the operation of this anode, very small particles of Pt, Pd, Ni, Ti, Fe, Va, Th, Cu, and the alloys thereof, suitably of platinum or palladium are deposited on the meniscus zones of the porous metal. The hydrogen generated at the external source (e.g. catalytic reformer) is diffused through the metalic body of the anode until it reaches the meniscus zones where the electrochemical reaction with the carbon compound fuel occurs. The occluded hydrogen will eliminate or greatly reduce the poisoning effect.

NPFCs BUILT WITH NON CONVENTIONAL POROUS SCREEN ANODES

Porous screen electrodes can also be used as nonpoisoning anodes. These electrodes use an inexpensive stable conductive screen (e.g. nickel wire gauze) as a support, to which it is applied a mixture of a hydrophilic catalytic material (e.g. platinum or a noble metal alloy), and a hydrophobic material (e.g. colloidal polytetrafluorethylene). Hydrogen is driven into this anode from the external source through the conductive screen to occlude the particles of catalytic material. This occluded hydrogen will eliminate or greatly reduce the poisoning of the electrocatalyst.

EXAMPLES

To test the operation of nonpoisoning fuel cells according with the principles of the present invention, several exampled methods were performed using aqueous solutions of carbon compound fuels and compact electrodes. A description of those examples is presented below, to illustrate the results. Those particular examples involve exemplary embodiments and do not intend to limit the extent and scope of the present invention. The reason for the presentation of those examples is to present evidence of the discovery of a new chemical process that greatly reduces or eliminates the poisoning of the electrocatalyst in fuel cells. The unique feature of this invention is the discovery of this new chemical process in which the chemidesorption of the poisons is due to the electrochemical reaction between the hydrogen deliberately occluded in the anode and the absorbed poisons. The same electrochemical reaction: the oxidation of the carbon compound fuel to the poison (CO or COH), the chemidesorption of the poison by the hydrogen and the further oxidation of the desorbed poison to $CO_2$ will take place wherever there will be a positive potential on a hydrogen diffusion material in contact with an aqueous electrolyte, regardless of the physical state(liquid or gaseous) of the reactants. The electrochemical reaction in porous gas diffusion electrodes is the same as that in solid electrodes. This discovery led to the invention of the new method and new apparatus configurations presented here. This invention makes it possible to build viable and competitive commercial non poisoning fuel cells that can work with any carbon compound fuel.

Examples Numbers 1, 2 and 3.

Figure 4:
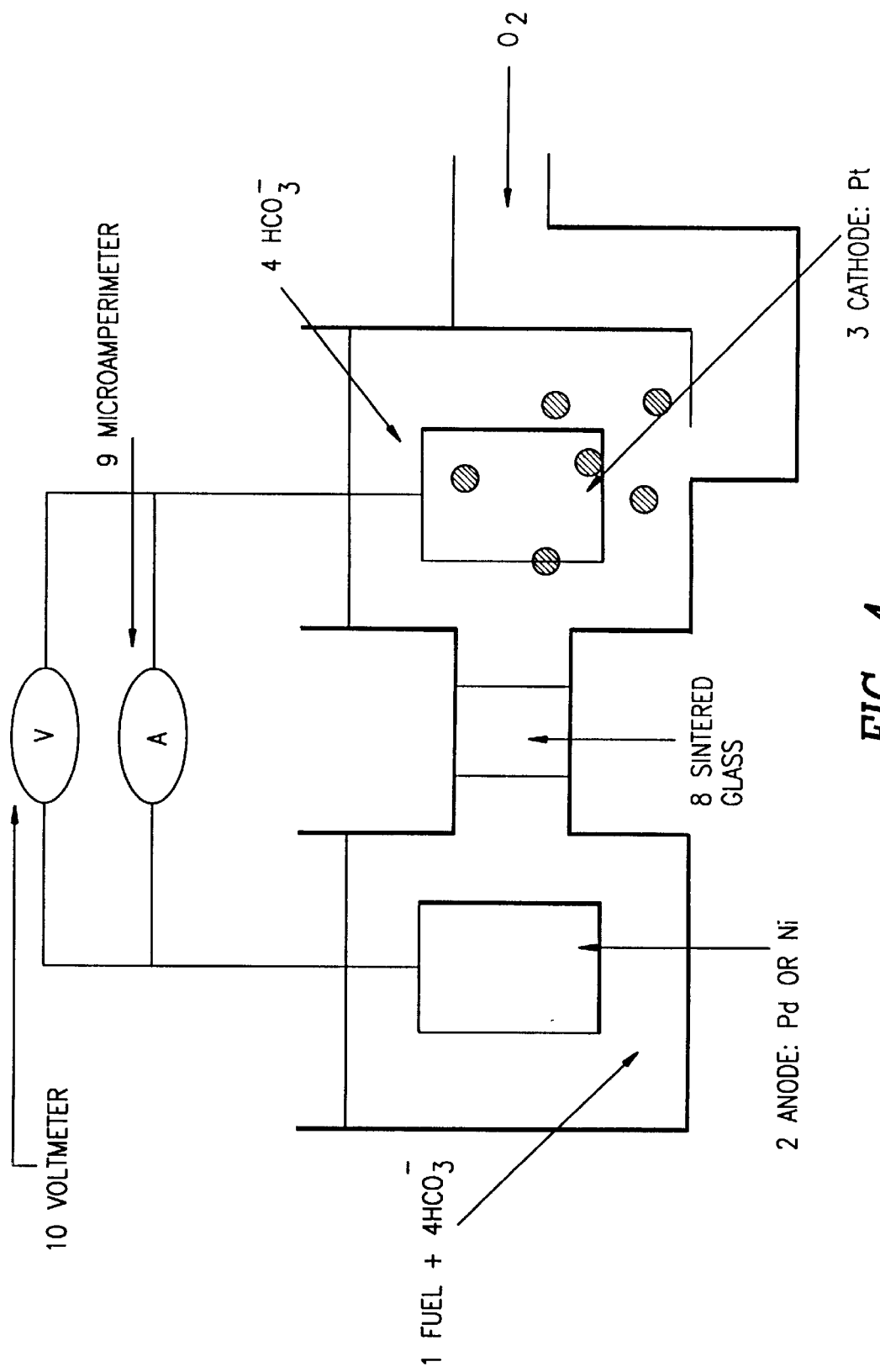
FIG. 4 is a schematic diagram showing details of the configuration of the fuel cell and measuring devices used to test the invention.

FIG. 4 shows a diagram of a single fuel cell built with a platinum wire cathode 3, a saturated solution of $HCO_3^-$ 4 and a compact anode 2: Pd (geometric area (g.a.=1 cm$^2$) or Ni (g.a.=2 cm$^2$)). The catholyte and anolyte were separated by a sintered glass 8. The external circuit was connected in series to a microamperimeter (A) 9 and in parallel with a voltmeter (V) 10.

Both Ni and Pd electrodes were occluded with hydrogen by applying a potential of −0.3 V (SCE) on a $HClO_4$ 0.1M solution. When said potential is applied, the following reaction occurs:

$$2H^+ + 2e \rightarrow H_2$$

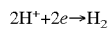

Through this process, 150 C of hydrogen were stored inside those anodes. Methanol, ethanol, butanol, thiocyanate (SCN$^-$) and sucrose were used as fuels in $HCO_3^-$ saturated aqueous solution.

Figure 5:
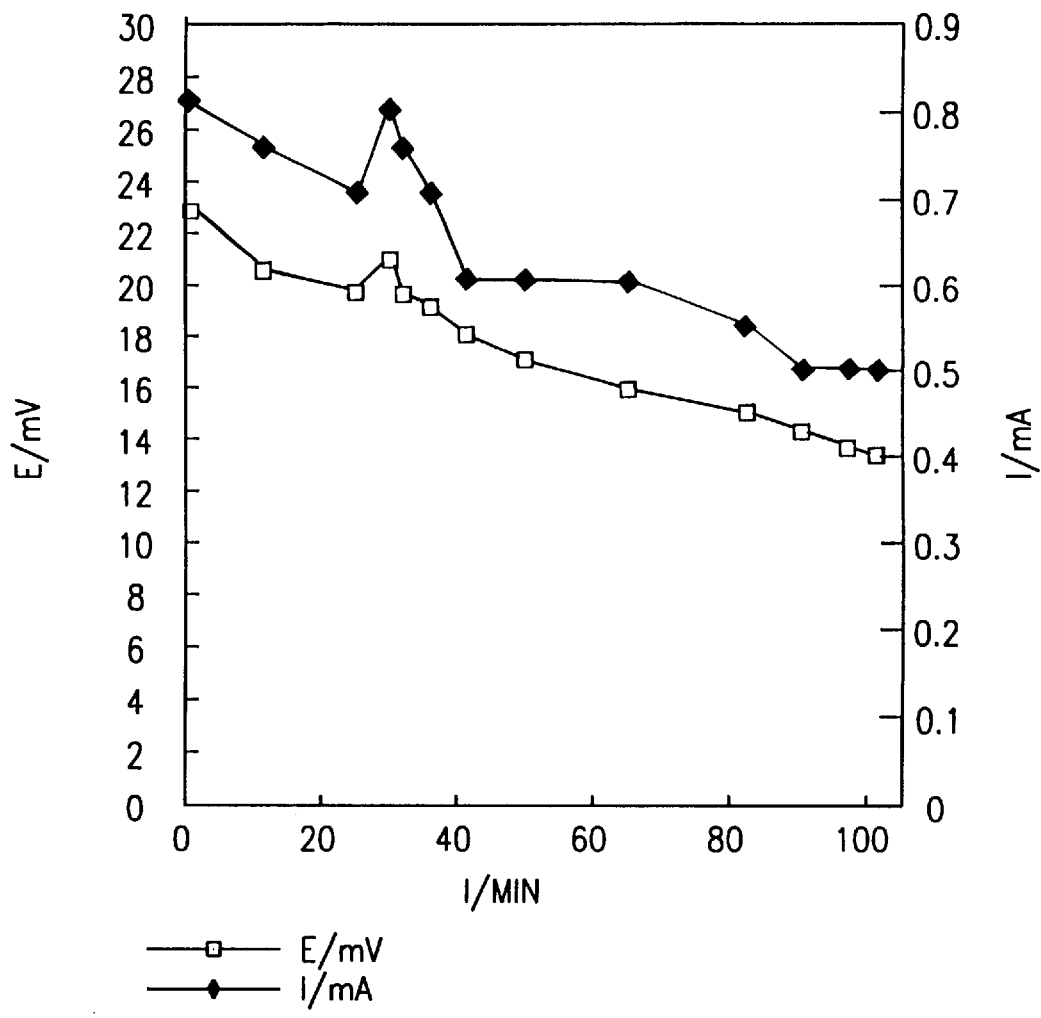
FIGS. 5–10 are characterist curve charts showing output over time of the fuel cell of FIG. 4 using various fuels.
Figure 6:
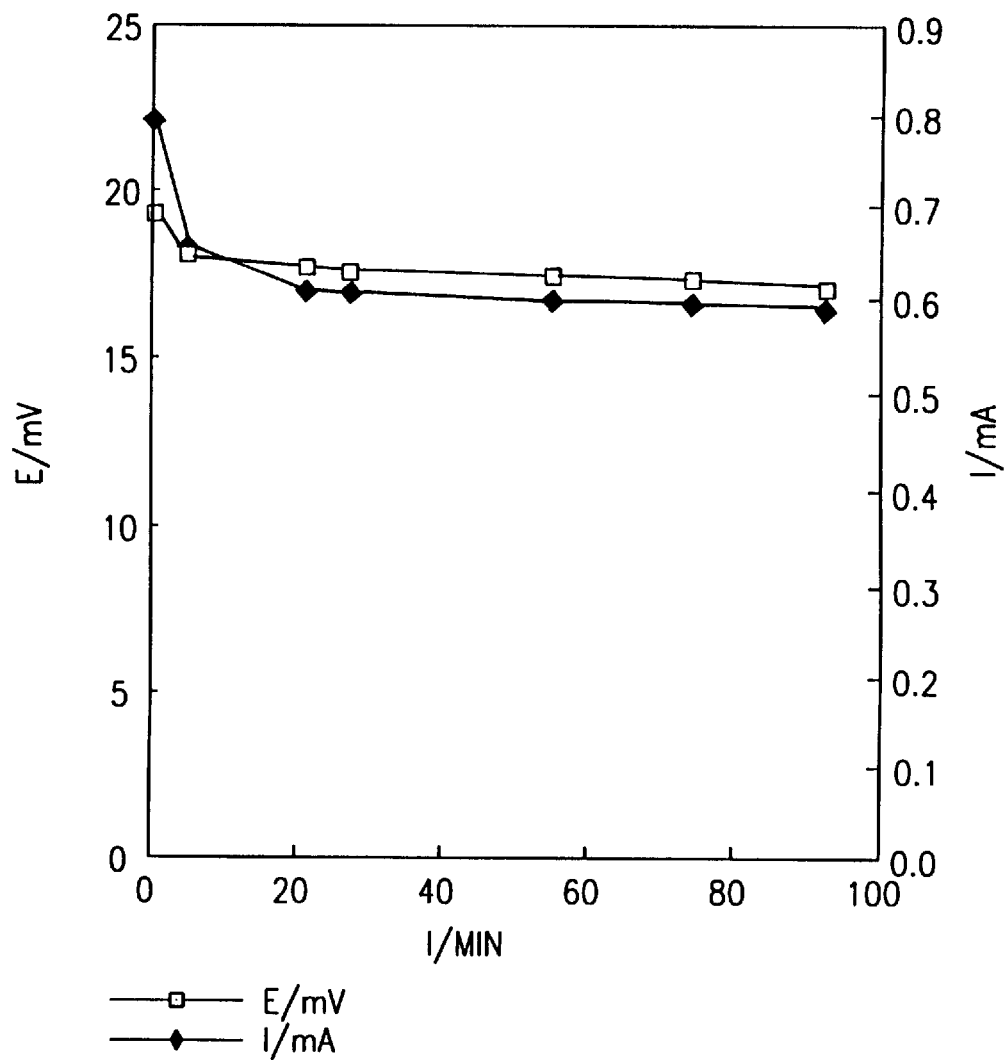

FIG. 5 shows the results obtained with the palladium electrode loaded with 150 C of hydrogen, after introducing it in $HCO_3^-$ saturated solution, and later switched to 0.2 methanol+$HCO_3^-$(sat). It can be seen that in the methanol free $HCO_3^-$ solution, the current went down quickly since the hydrogen is being discharged and oxidized. This example is equivalent to the use of hydrogen as a fuel in hydrogen stored material anodes as was done by Furukawa, Sakai and Ovshinsky in the patents above mentioned. But when the methanol is added, an increase of the current and potential can be seen initially. Afterward the fuel cell kept generating current in a relatively constant way between 0.6 and 0.5 mA during 70 minutes. After that, $CO_2$ bubbles were seen over the anode. The behavior of the current and potential and the appearance of the $CO_2$ bubbles indicate that the methanol is being oxidized, without producing any poisoning. The same behavior was observed when ethanol and butanol were used as fuels as can be seen in FIGS. 6 and 7.

Example Number 4

Figure 7:
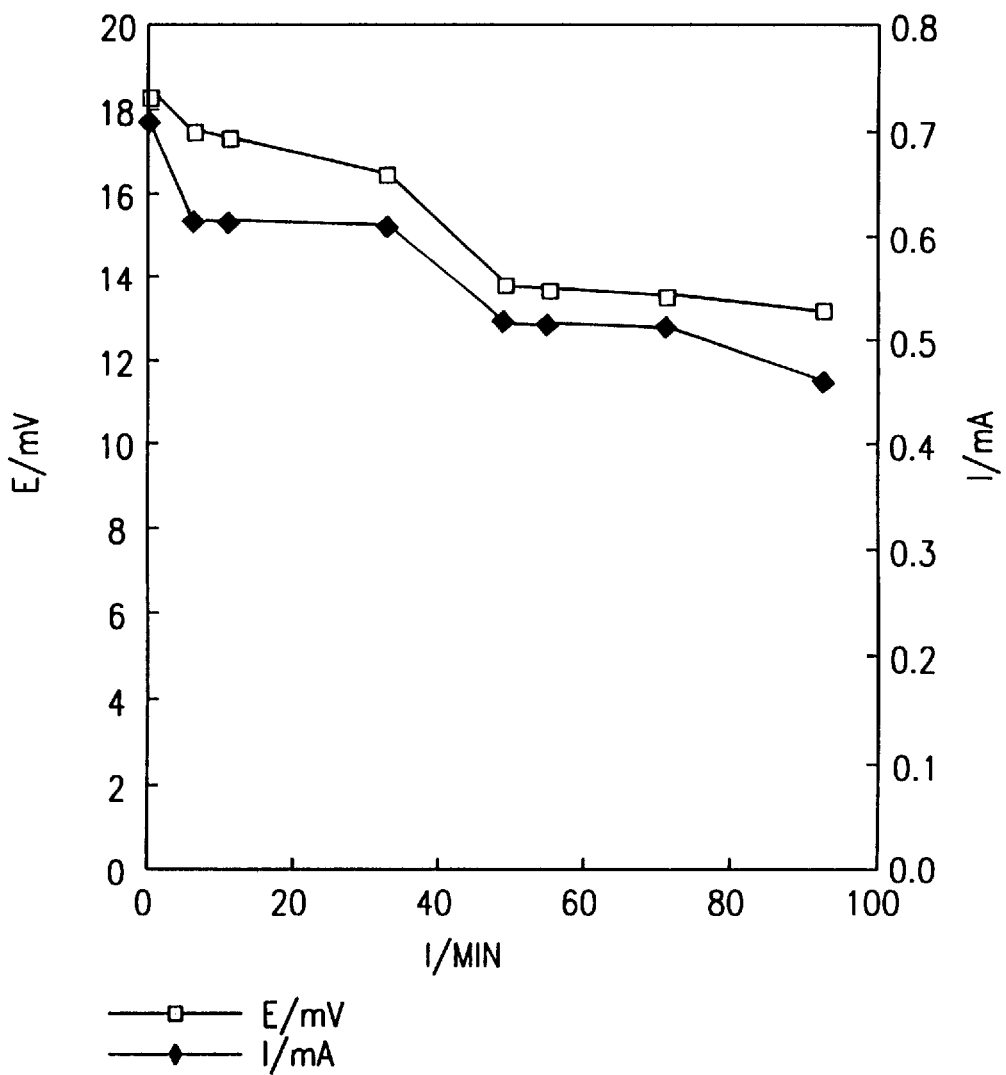

FIG. 7 shows the output of the FIG. 1 fuel cell which included oxidation of sucrose (cane sugar) on a palladium anode with hydrogen deliberately occluded. As can be seen again a relatively constant current between 0.35 and 0.4 mA could was observed after three hours.

Example Number 5

Figure 8:
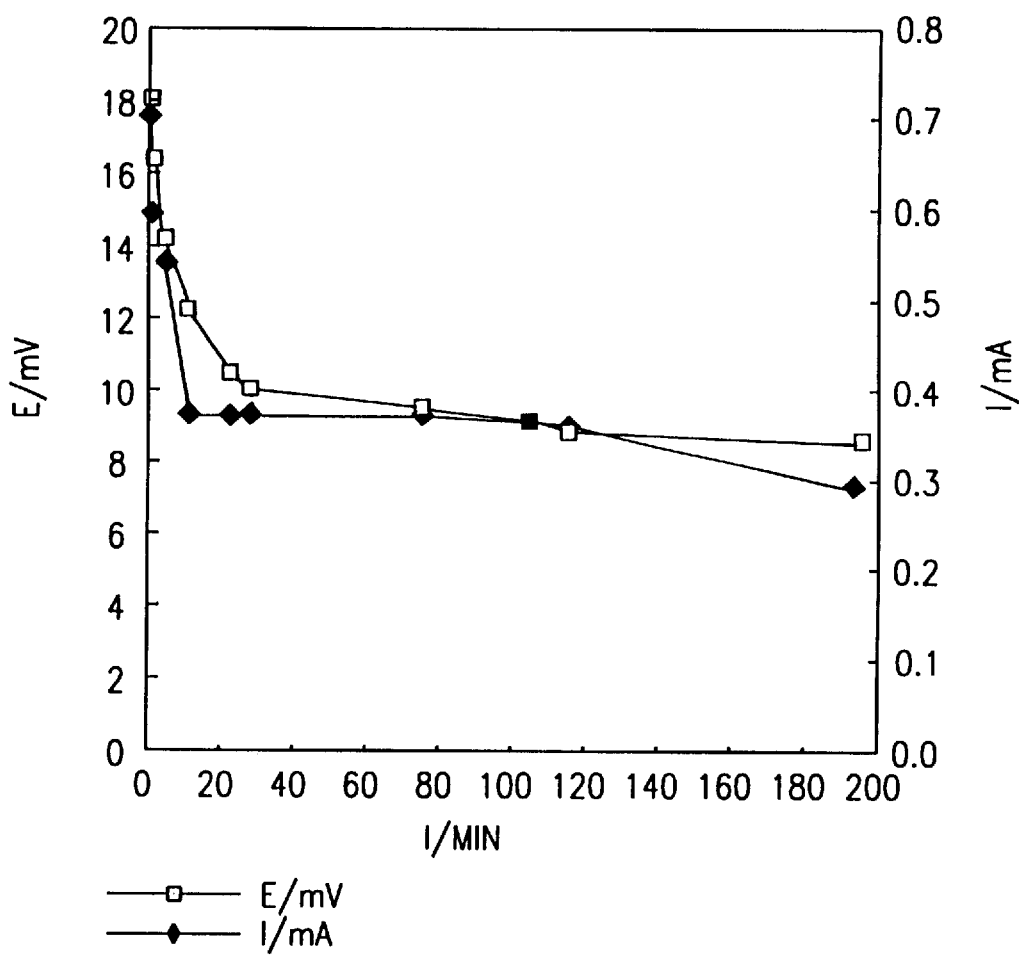

FIG. 8 presents the results obtained when SCN$^-$ was oxidized on a palladium anode with hydrogen deliberately occluded. This experiment was performed to observe if the sulfur acts as poison over the surface of the electrocatalyst. As can be seen in FIG. 8 current was still being produced after 45 minutes. Carbon dioxide bubbles were also seen in this example.

Example Number 6

Figure 9:
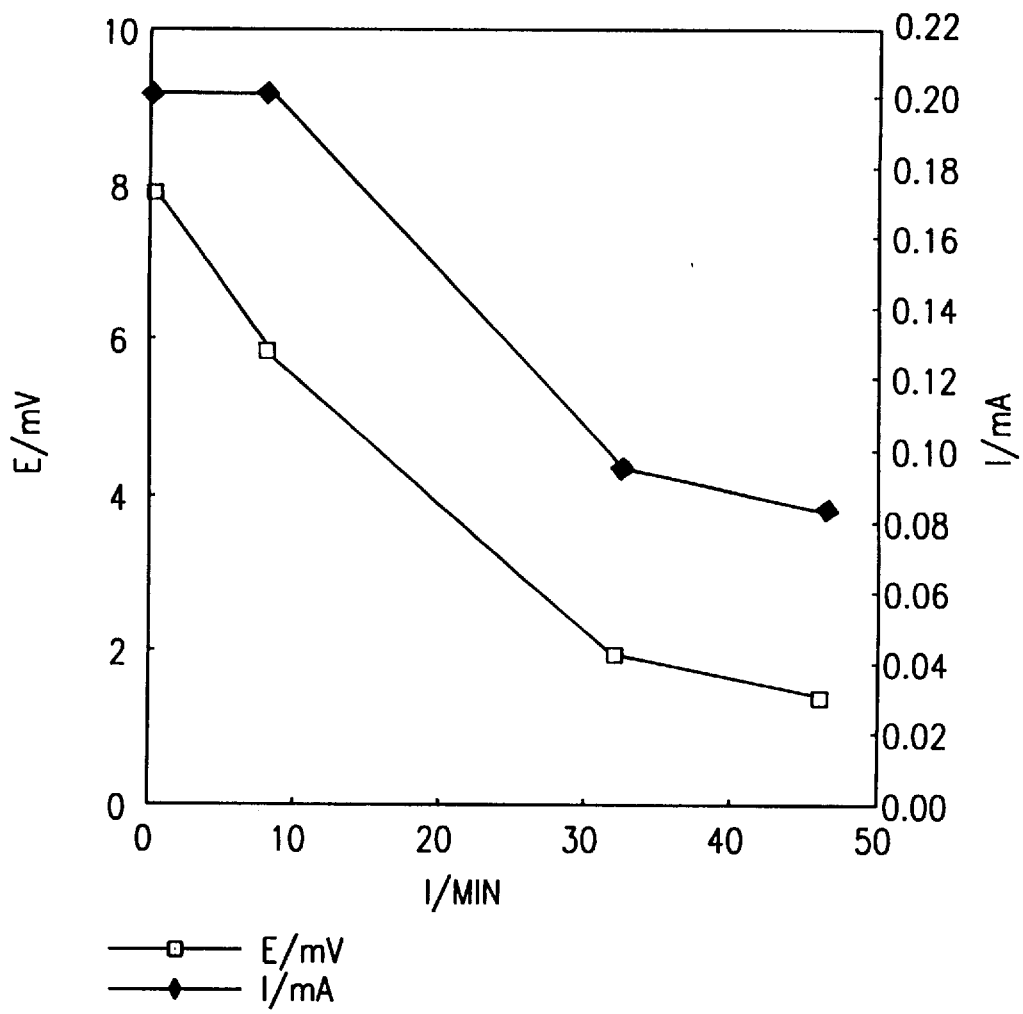
Figure 10:
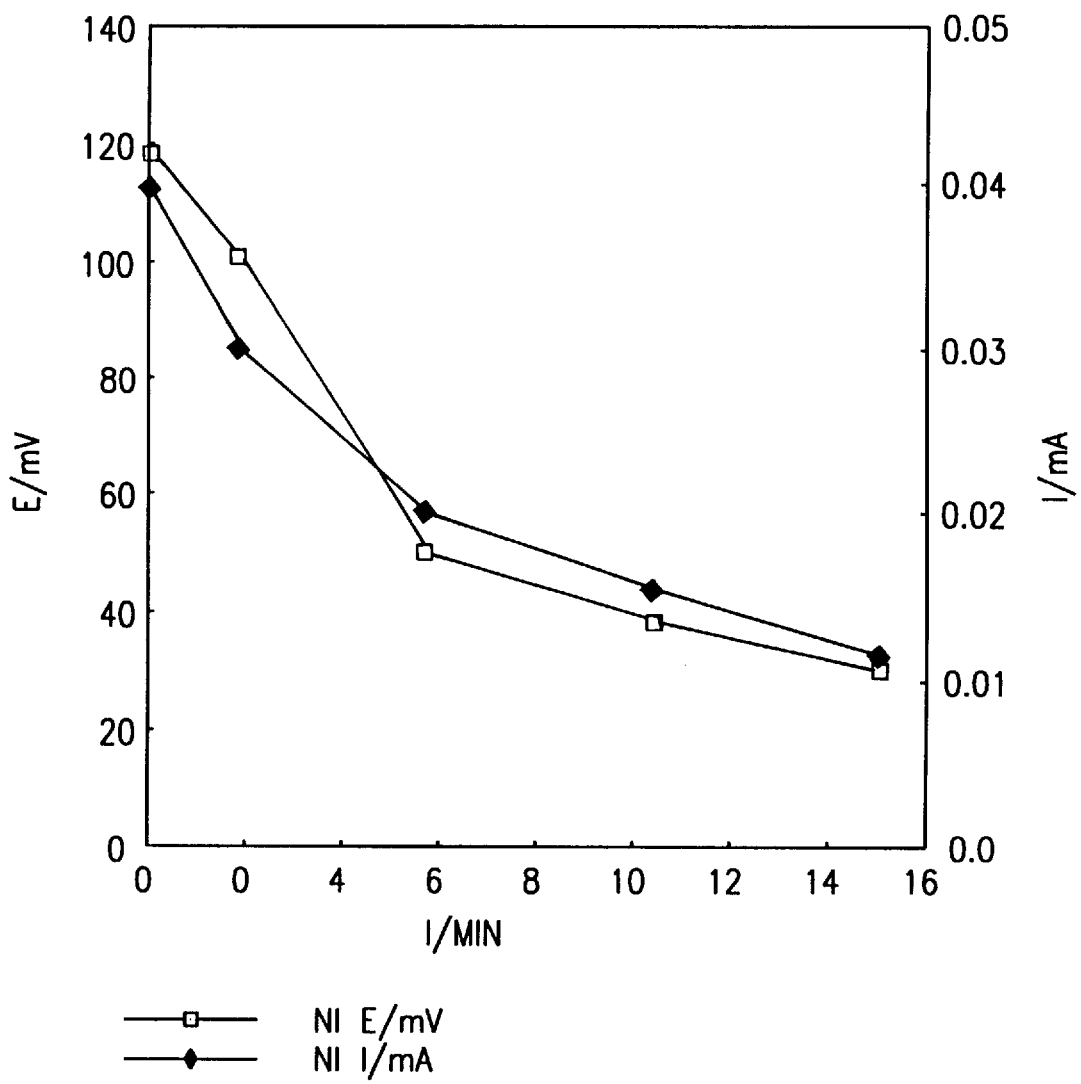

FIG. 9 shows the results obtained with a nickel anode, loaded with 150 C of hydrogen, after introducing it in a 0.2M methanol+$HCO_3^-$ solution. Taking into account that the nickel ability to store hydrogen is much less than palladium's, the fact that a relatively constant current reading between 0.01 and 0.023 mA was observed during 9 minutes, indicates that the methanol was oxidized in that period of time without producing the surface poisoning. This example was performed to show that in principle any materials capable of storing and diffusing hydrogen can be used as an anode according to this invention, although with varying degrees of performance. This also shows that it is possible to use more abundant and less costly materials to build the anode of the FIG. 1 fuel cell.

As can be understood from the examples presented above, in this invention, the hydrogen occluded in the anode is not used as a fuel. The above described results make evident that occluded hydrogen goes through the body of the electrocatalyst, reacts with the poisons, and then, the products of this reaction are further oxidized to $CO_2$, allowing a clean surface for the next fuel molecule. In a conventional fuel cell, the hydrogen used as fuel is oxided directly over the surface of the electrocatalyst.

For example, in a conventional fuel cell that uses methane as fuel, the gas enters through a catalytic reformer to obtain hydrogen as follows:

Catalytic reformer: $CH_4 + O_2 \rightarrow CO_2 + 2H_2$

The hydrogen obtained above then goes through the fuel cell where it is oxidized to produce electricity as follows:

Cell Anode: $2H_2 \rightarrow 4H + 4e-$ $$\text{Cathode:} \frac{O_2 + 4H^+ + 4e- \rightarrow 2H_2O}{CH_4 + 2O_2 \rightarrow CO_2 + 2H_2O}$$

This reaction produces four moles of electron per mole of methane, i.e. $e/CH_4 = 4$.

Assuming that the efficiency of destroying the poison is 100%, i.e. that all occluded hydrogen chemidesorbs CO molecules, then fuel cells according to the present invention would be using half of the needs of the catalytic reformer as follows:

In the catalytic reformer:

$½CH_4 + ½O_2 \rightarrow ½CO_2 + H_2$

In the fuel cell:
Anode, carbon compounds oxidation:

$H_2O + CH_4 \rightarrow CO + 6H^+ + 6e-$

Anode, occlusion of hydrogen:

$H_2:H_2 \rightarrow 2H^*$

Anode, poison chemidesorption:

$2H^* + CO \rightarrow H_2C$

Anode, poison oxidation:

$H_2O + H_2CO \rightarrow CO_2 4H^+ + 4e-$

Cathode, oxygen reduction:

$$\frac{10H^+ + 10e- + 5/2O_2 \rightarrow 5H_2O}{3/2CH_4 + 3O_2 \rightarrow 3/2CO_2 + 3H_2O}$$

The above reaction produces 6.6 mole of electrons per mole of fuel. This result represents 1.65 times more electrical energy per mole of fuel than in the conventional reaction. If the occluded hydrogen would oxidize without eliminating any poisoning, the power output per mole of fuel would be equivalent to the one obtained in a conventional fuel cell.

It should be understood that various modifications and enhancements may be made to fuel cells and the methods of operation as described herein without departing from the principles and scope of the present invention.

ADVANTAGES OF THE NEW METHOD AND CONFIGURATION

A principal advantage of the method and configuration of this invention is to eliminate or greatly reduce the poisoning of the electrocatalyst in fuel cells that use a carbon compound as fuel. As a consequence of achieving this goal it will be possible to accomplish other all important objectives:

1) To manufacture cost effective and more efficient commercial fuel cells, competitive with other power sources in price, operational costs, volume, weight, lifetime, and power output. These efficient, quiet and non polluting fuel cells will replace economically the existing power sources that damage the environment.

2) To build multifuel cells capable of using commercial fossil and renewable fuels as its normal input. With this invention, hydrogen will no longer be the only effective and practical fuel.

3) The efficiency of the NPFCs is higher than in the existing conventional fuel cells, making its operation more economical.

3) To build NPFCs using electrodes made fundamentally of inexpensive nickel catalysts mixed with small amounts of platinum, palladium, etc., capable to work at room temperatures and pressures.

Furthermore, a secondary objective of this invention is to make possible to build devices to detect carbon compounds, to eliminate carbon compounds in sewage (useful in pollution fighting devices) and to destroy animal tissue (useful in medical devices, to destroy tumors for example).

What is claimed is:

1. A method of generating electricity in a fuel cell utilizing as a fuel, a carbon compound which undergoes electroxidation in said fuel cell, said cell comprising:

a cathode, an electrolyte, and an anode, said anode comprising a first face that is fluid permeable and a second face in contact with said electrolyte, said second face comprising a hydrogen transmissive membrane made of an electrocatalytic metallic element which stores and diffuses hydrogen in atomic form, said membrane having an absorption side and an opposite insertion reaction side, comprising the steps of:

a. feeding hydrogen from a source thereof to the absorption side of said hydrogen transmissive membrane where hydrogen is absorbed, b. passing hydrogen In atomic form, through the membrane to said opposite insertion reaction side thereof, c. providing said carbon compound to said insertion reaction side, d. allowing the direct electroxidation reaction of said carbon compound on the insertion reaction side to give a electroxidation reaction product.

e. chemically reacting the said electroxidation reaction product of the said carbon compound, with the hydrogen passed through the membrane to give a reduction product;

f. further electroxidizing said reduction reaction product of step (e) to provide carbon dioxide, as the principal product of the complete electrochemical oxidation of the said carbon compound; and g. drawing electricity generated in said fuel cell from the cathode and anode thereof.

2. The method of claim 1 wherein the reaction insertion side comprises electrocatalytic particles.

3. The method of claim 2 wherein the electrocatalytic particles are selected from the group of metals consisting of Pt, Pd, Ni, Ti, Fe, Va, Th, Cu, and the alloys thereof.

4. The method of claim 2 wherein the membrane material is selected from the group of metals consisting of Pd, Ni, Ti, Fe, Va, Ta, Cu, and the alloys and mixtures thereof.

5. The method of claim 1 wherein the insertion reaction side is in contact with an electrolyte tolerates carbonation.

6. The method of claim 1 wherein the insertion reaction side is in contact with an electrolyte selected from the group consisting of aqueous sodium bicarbonate and phosphoric acid.

7. The method of claim 1 wherein the insertion reaction side is in contact with colloidal polytetrafluorethylene.

8. The method of claim 1 wherein the absorption side is maintained in contact with hydrogen.

9. The method of claim 1 comprising providing electrolytically formed hydrogen to the absorption side of the membrane.

* * * * *